United States Patent
Hough et al.

(10) Patent No.: US 11,705,747 B2
(45) Date of Patent: Jul. 18, 2023

(54) OPEN CONCEPT CHARGING COMPUTER CART

(71) Applicant: Bretford Manufacturing, Inc., Franklin Park, IL (US)

(72) Inventors: Jack Hough, Arlington Heights, IL (US); Cary Maguire, Chicago, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 256 days.

(21) Appl. No.: 17/354,002

(22) Filed: Jun. 22, 2021

(65) Prior Publication Data
US 2021/0408812 A1    Dec. 30, 2021

Related U.S. Application Data (60) Provisional application No. 63/045,443, filed on Jun. 29, 2020.

(51) Int. Cl.
| | |
|---|---|
| *H01M 10/46* | (2006.01) |
| *H02J 7/00* | (2006.01) |
| *G06F 1/16* | (2006.01) |

(52) U.S. Cl.
CPC .......... *H02J 7/0044* (2013.01); *G06F 1/1632* (2013.01)

(58) Field of Classification Search
CPC .... H02J 7/0044; H02J 7/0013; H02J 2310/16; G06F 1/1632; G06F 1/266; G06F 1/181; G06F 1/189
USPC ........ 320/107, 110, 114, 115, 116; 312/128, 312/133, 257
See application file for complete search history.

(56) References Cited

U.S. PATENT DOCUMENTS

| | | | |
|---|---|---|---|
| 2014/0191729 A1* | 7/2014 | Guasta ................... | G06F 1/1632 320/137 |
| 2015/0253818 A1* | 9/2015 | Wong ...................... | G06F 1/182 361/679.55 |
| 2016/0205800 A1* | 7/2016 | Roberts ................. | H02J 7/0045 361/809 |
| 2017/0027079 A1* | 1/2017 | Dombrowski ........ | G06F 1/1628 |

* cited by examiner

Primary Examiner — Edward Tso
(74) Attorney, Agent, or Firm — Anderson Gorecki LLP (57) ABSTRACT

An open concept computer cart has a frame, a lower computer storage shelf supported by the frame, an upper computer storage shelf supported by the frame, and a forward-facing brick storage area formed vertically intermediate the upper and lower computer storage shelves. The upper and lower computer storage shelves are rearwardly inclined to prevent computers stored thereon from sliding off of the shelves. A single wiring retention strip is formed along a front surface of the open concept computer cart, and a power outlet strip is formed along a rear of the brick storage area. The wiring retention strip has wire retention cutouts formed along its length to retain charging tethers for computers stored on both the upper and lower computer storage shelves.

15 Claims, 12 Drawing Sheets

OPEN CONCEPT CHARGING COMPUTER CART

CROSS-REFERENCE TO RELATED APPLICATIONS

This application claims priority to U.S. Provisional Patent Application No. 63/045,443, filed Jun. 29, 2020, entitled Open Concept Charging Computer Cart, the content of which is hereby incorporated herein by reference.

FIELD

The present invention relates to electronic device storage systems and, more particularly, to an open concept charging computer cart with improved wiring characteristics that is designed to store and charge portable computing devices.

BACKGROUND

Portable computing devices typically include a battery that may be charged to enable the portable computing device to be used while not connected to an electrical outlet. Some portable computing devices use an electrical adapter to convert 120/240 Volt (V) 60/50 Hz AC electrical power available in a standard electrical outlet to a lower voltage (e.g. 19.5 volt or 24 volt) DC power, which is then input to the portable computing devices to charge its battery. Electrical adapters of this nature are referred to herein as "bricks". Other portable computing devices are configured to use an electrical adapter to convert electrical power available at a standard electrical outlet to a lower voltage level, e.g. 5 volts, which is then input to the portable computing device to charge its battery.

Groups of portable computing devices, such as laptop computers, Chromebooks, tablet computers, and other computing devices are commonly used in educational facilities to enrich the curriculum provided to students. A laptop computer generally has a screen which may be touch-sensitive or not touch-sensitive, and an attached keyboard. A chromebook is a laptop computer that is designed to run Google's Chrome Operating System (OS), rather than Windows OS or MacOS. A tablet computer generally has a touch-sensitive screen and may or may not have an attachable/detachable keyboard. As used herein, the term "portable computer" will be used to refer to any of these types of portable computing devices. Groups of portable computers may be used contexts other than education, such as in museums, to provide entertainment on airplanes, and in multiple other contexts.

Computer carts have been developed which may be used to store groups of portable computers and to charge the portable computers while stored therein. Generally, a computer cart has castors that enable the group of portable computers to be moved within the facility, such as between classrooms.

Typical computer carts have external panels or doors covering all six sides of the computer cart. A pair of doors on the front or top is used to obtain access to the portable computers stored within the cart. If the computer cart includes a separate brick storage area, generally the brick storage area is located at the back of the computer cart, which may be accessed via a second set of rear doors or a removable rear panel.

While computer carts of this nature are secure, e.g. by locking the doors of the computer cart to prevent someone from obtaining access to the portable computers, the additional panels and doors increase the weight of the computer cart and the additional material and components also increases the overall cost of the cart. For example, some computer carts can weigh almost 200 lbs, without devices. If a portable computer and associated bricks and cabling weighs a combined 3 lbs, and the computer cart is designed to store 24 or 36 portable computers, the overall weight of a fully loaded computer cart can be almost 300 lbs, which can be difficult to push around an educational facility, particularly if there are ramps in the hallways between classrooms.

To make it easy to remove portable computers from a computer cart and to return the portable computers to the computer cart, it is common for the bricks to be stored in the computer cart so that the students are only required to manipulate the portable computers themselves. For example, if the computer cart includes individual storage bays, a charging tether from a corresponding brick may be fed through into the individual storage bay so that it is easy for the computer to be plugged into a brick to be charged while stored within the cart. The charging tether is connected to the brick which is plugged into a power strip within the cart, so that the portable computers can be charged without requiring the students to have access to the bricks.

Configuring a computer cart in this manner provides the users with easy access to portable computers, but requires significant labor to wire the cart. For example, if the cart is designed to hold 30 computers, a technician will need to install 30 bricks and feed 30 charging tethers through and into the area of the computer cart where the computers will be stored. If one of the bricks subsequently fails, the technician will need to isolate the failed brick to determine which one of the bricks should be replaced. Accordingly, it would be advantageous to provide a new type of computer cart with improved wiring characteristics.

SUMMARY

All examples and features mentioned below can be combined in any technically possible way.

An open concept computer cart has a frame, a lower computer storage shelf supported by the frame, an upper computer storage shelf supported by the frame, and a forward-facing brick storage area formed vertically intermediate the upper and lower computer storage shelves. The upper and lower computer storage shelves are rearwardly inclined to prevent computers stored thereon from sliding off of the shelves.

A wiring retention strip is formed along a top front surface of the forward-facing brick storage area, and a power outlet strip is formed along a rear of the brick storage area. The wiring retention strip has wire retention cutouts formed along its length to correspond to the number of portable computer storage slots on the top and bottom rearwardly inclined portable computer storage shelves. Using a single wiring retention strip to feed both the top and bottom portable computer storage shelves reduces the number of components required to manage the charging tethers, while also providing convenient access to the charging tethers so that users can easily remove and return portable computers from the cart.

To wire the cart, a person reaches into the forward-facing brick storage area, inserts the plug from the brick into a receptacle on the power outlet strip at the rear of the brick storage area, and then threads the charging tether into a selected one of the wire retention cutouts to be retained by the wire retention cutout. In embodiments where the power outlet strip is configured to provide DC power, the brick may be eliminated and the charging tether may be plugged directly into outlets of the power outlet strip. Since the charging tether does not need to be fed from a separate brick storage area, that is only accessible from the rear of the computer cart, to the front of the computer cart, this significantly reduces the amount of time it takes to install bricks into the computer cart.

DETAILED DESCRIPTION

Figure 1:
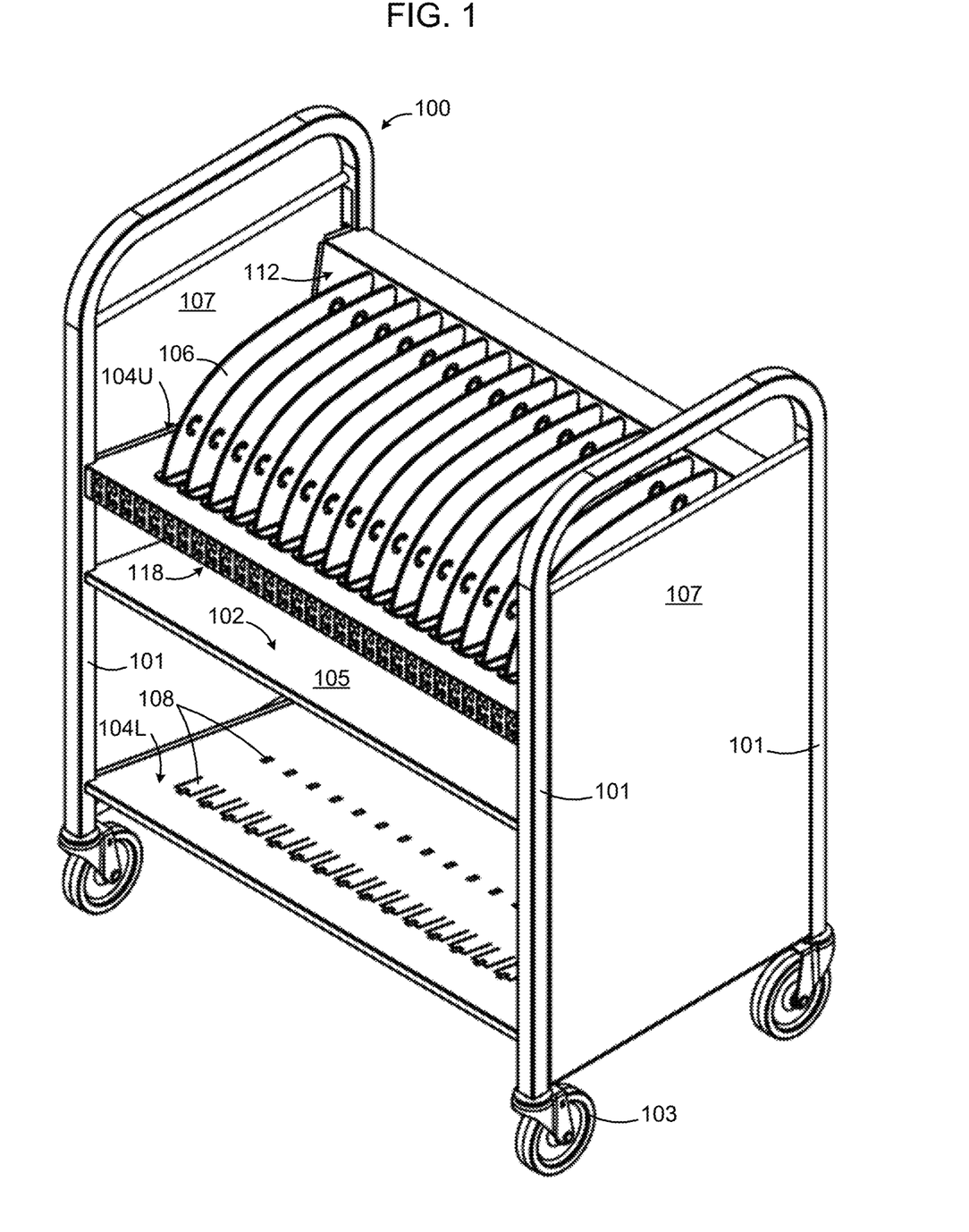
FIG. 1 is a front perspective view of an example open concept computer cart, according to some embodiments.
Figure 6:
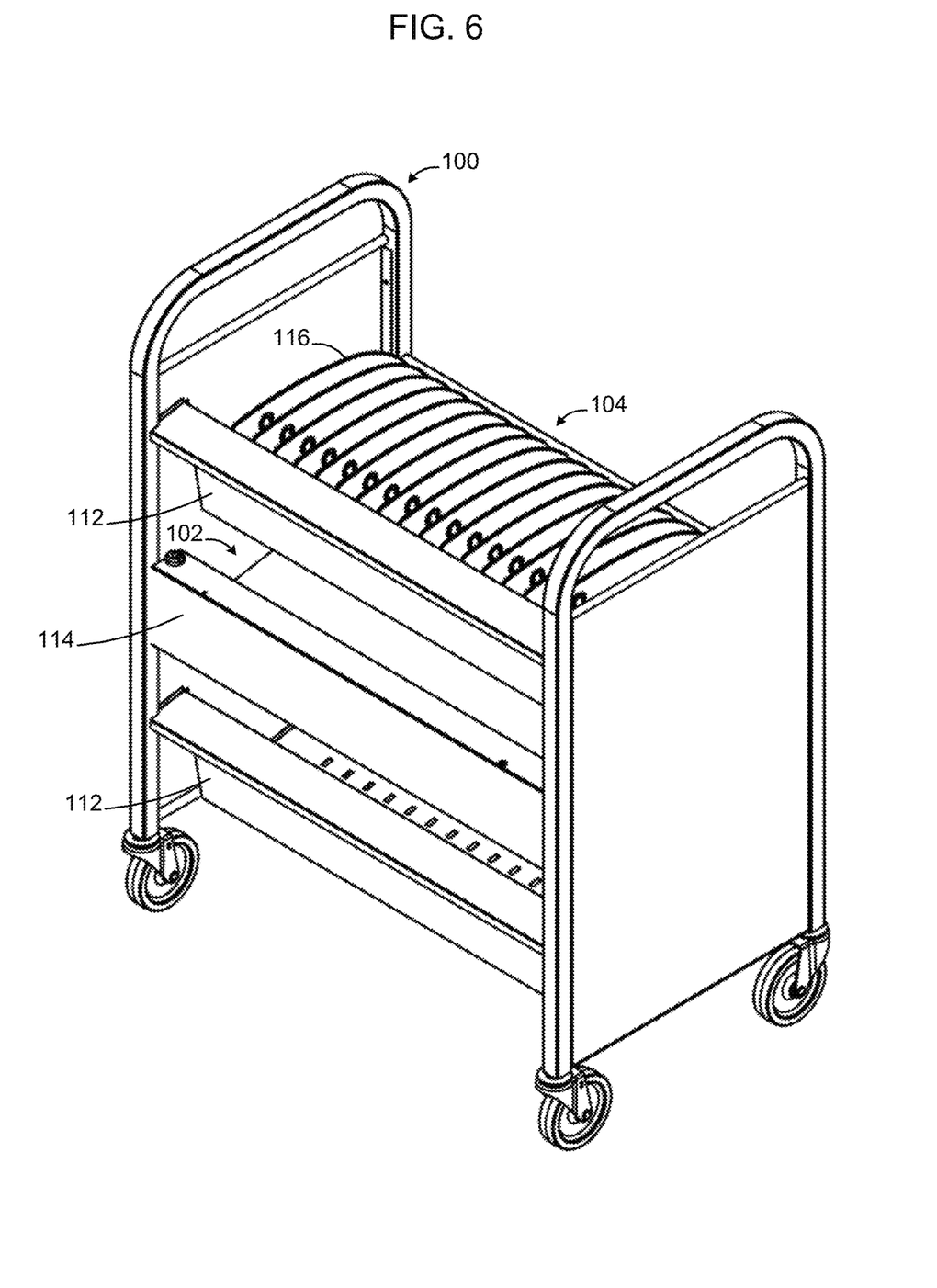
FIG. 6 is a back, perspective view of the example open concept computer cart of FIG. 1, according to some embodiments.

This disclosure is based, at least in part, on the realization that it would be desirable to provide an open concept computer storage cart with improved wiring characteristics. As shown in FIGS. 1 and 6, the open concept computer cart 100 does not have a top surface, front doors, or rear panel/doors, thus significantly reducing the cost of manufacturing the computer cart and likewise reducing the weight of the computer cart. For example, by not including the top surface, front doors, and rear panels/doors, it is possible to reduce the weight of the cart to on the order of 80 lbs, which is significantly less than similar capacity computer carts that include all of those additional components. Additionally, although the cart shown in FIG. 1 is shown as having solid side panels 107, in some embodiments the side panels 107 are perforated or are implemented as partial panels to further reduce the weight of the cart.

FIG. 1 is a front perspective view of an example open concept computer cart, according to some embodiments. As shown in FIG. 1, in some embodiments the open concept computer cart 100 is formed in a manner similar to a book truck, with a frame 101 configured to support shelves 102, 104, and having four castors 103 on the corners which enable the cart to roll and provide mobility to the cart.

The term "open concept" is used herein to refer to a computer cart that does not have sufficient panels to secure the portable computers from being removed from the computer cart. Other security mechanisms, such locking bars, may optionally be used to secure the computers depending on the implementation. Depending on the implementation, an "open concept" computer cart may not have one or more of the top surface, front doors, rear panel/doors, and/or side panels, thus providing open access to the laptop computers stored therein. By eliminating some or all of these panels and doors, the cost of manufacturing the computer cart can be significantly reduced. Likewise eliminating some or all of these panels and doors can significantly reduce the weight of the computer cart.

As shown in FIG. 1, the open concept computer cart has a frame 103, a lower computer storage shelf 104L supported by the frame, an upper computer storage shelf 104U supported by the frame, and a forward-facing brick storage area 102 vertically intermediate the upper and lower computer storage shelves. The forward-facing brick storage area 102 may be defined, for example, by a lower rearwardly inclined bottom panel 105 and a lower side of the upper computer storage shelf 104U. The upper and lower computer storage shelves are rearwardly inclined to prevent computers stored thereon from sliding off of the shelves.

As used herein, the term "rearwardly inclined" is used to define a sloping shelf that is higher toward the front of the cart and lower toward the back of the cart when the base of the computer cart is placed on a horizontal surface. Thus, in normal use, if the cart has four castors, and the four castors of the cart are placed on a horizontal surface such as the floor of a classroom, a "rearwardly inclined" shelf will refer to a shelf that is higher toward the front of the cart and lower toward the rear, such that a computer placed on the rearwardly inclined shelf would tent to slide toward the rear of the cart under the force of gravity.

The upper computer storage shelf 104U, lower computer storage shelf 104L, and the bottom panel 105 of the brick storage area 102 may be welded to the frame 101, or secured to the frame 101 using removable fasteners such as bolts or unremovable fasteners such as rivets. Likewise, the side panels 107 may be welded to the frame 101, or secured to the frame 101 using removable fasteners such as bolts or unremovable fasteners such as rivets.

In some embodiments the open concept computer cart 100 has a forward-facing brick storage area 102 vertically intermediate an upper rearwardly inclined portable computer storage shelf 104U, and a lower rearwardly inclined portable computer storage shelf 104L. A set of dividers 106 is provided on each of the upper and lower portable computer storage shelves 104U, 104L. The dividers define storage bays for the portable computers. In the example open concept computer cart 100 shown in FIG. 1, each shelf is configured to have sixteen dividers 106, thus configuring the cart to hold a set of 30 portable computers in 30 storage bays. Other embodiments may have other numbers of storage bays, such as 24 or 36 storage bays, depending on the implementation.

Figure 4:
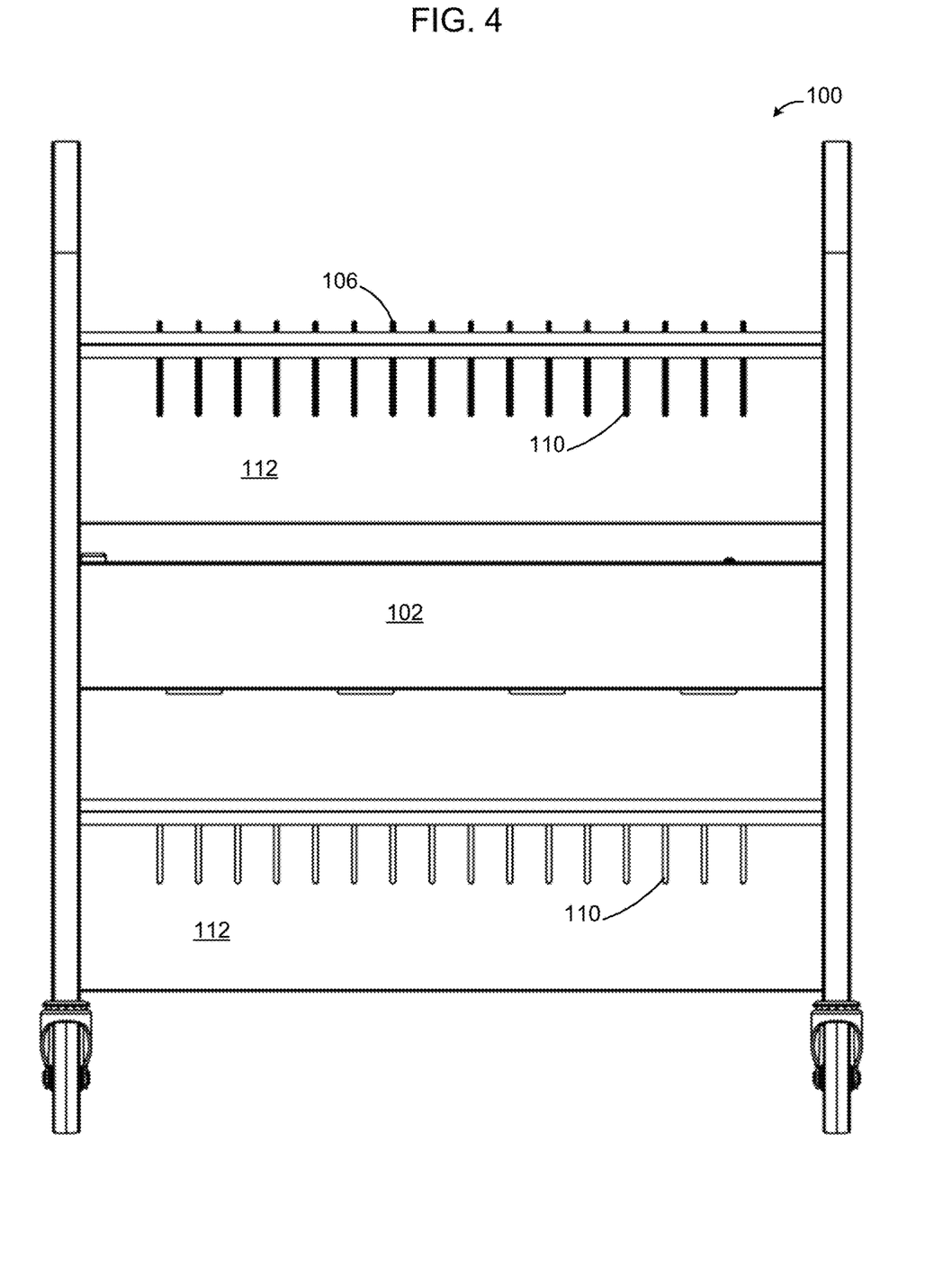
FIG. 4 is a back view of the example open concept computer cart of FIG. 1, according to some embodiments.
Figure 5:
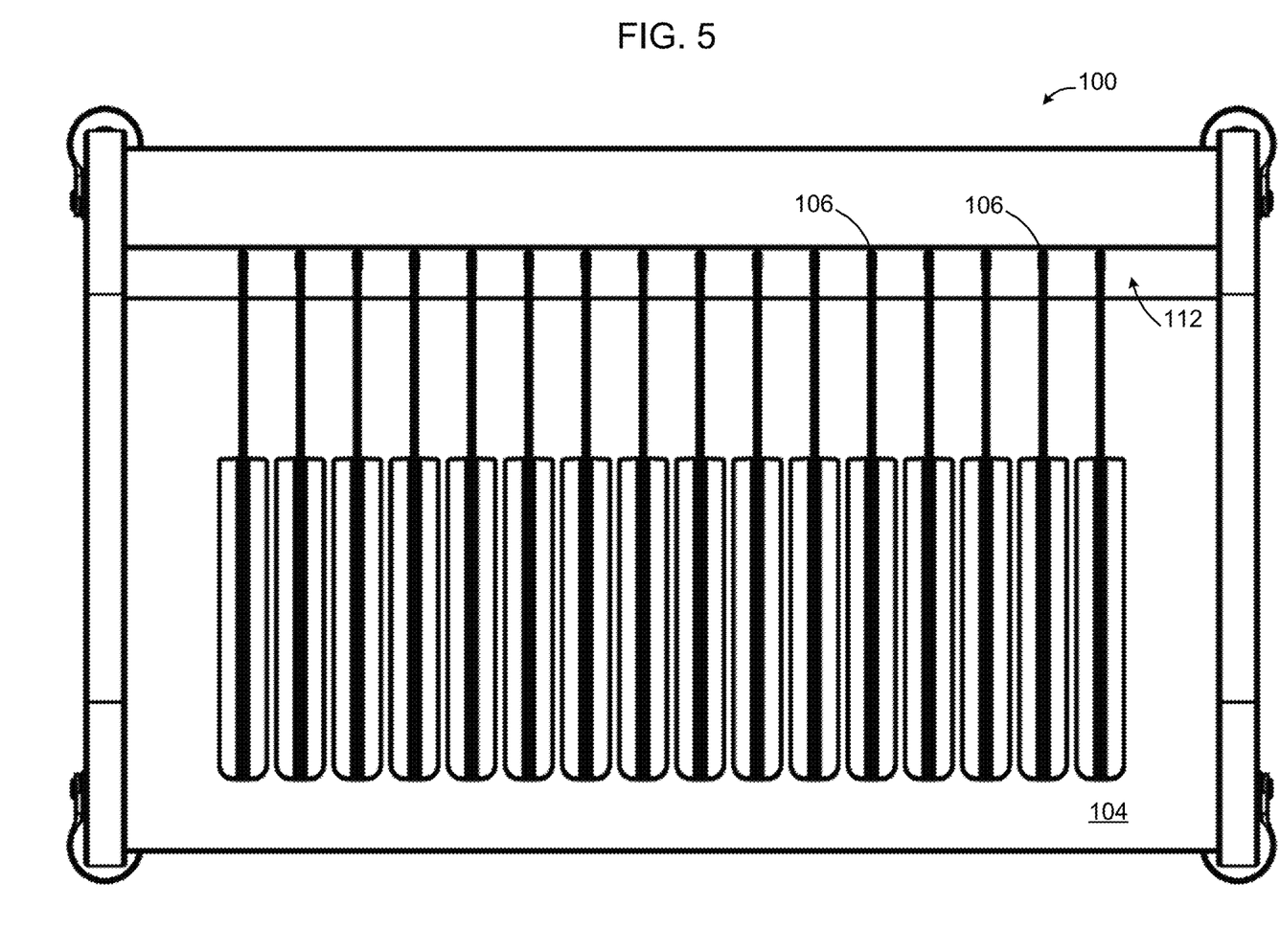
FIG. 5 is a top view of the example open concept computer cart of FIG. 1, according to some embodiments.

The dividers 106 on the lower shelf are not shown in FIG. 1 to enable engaging slots 108 to be seen. Engaging slots 108 enable the dividers 106 to snap into the lower shelf and to be attached to the portable computer storage shelves 104U, 104L without the use of screws or other fasteners. In some embodiments, vertical slots 110 are formed on the rear wall 112 of the shelf 104 (see e.g. FIGS. 2 and 4) to provide lateral stability to dividers 106. Other ways of attaching the dividers 106 to the shelves 104, including the use of mechanical fasteners such as screws, bolts, or rivets, may be used depending on the implementation.

In some embodiments, instead of using dividers 106 to house individual portable computers, baskets are provided which are configured to house sets of computers. For example, each bracket may have a handle and a body configured to define a set of 5, 6, or another number of storage bays for a set of portable computers. The baskets are designed to sit on the upper and lower shelves 104U, 104L, while containing sets of portable computers. To enable the portable computers to be charge while stored in the baskets, the portable computers are individually connected to respective charging tethers while retained on the shelves in the baskets. To distribute the portable computers, for example within a classroom, the tethers are removed from the portable computers stored in a given basket, and the basket of portable computers is then removed from the open concept computer cart 100. The basket is then carried by the handle as the portable computers are distributed to students, thus enabling the teacher, or teacher's assistant, to securely carry a group of portable computers to enable the portable computers to be distributed to students more quickly.

Figure 3:
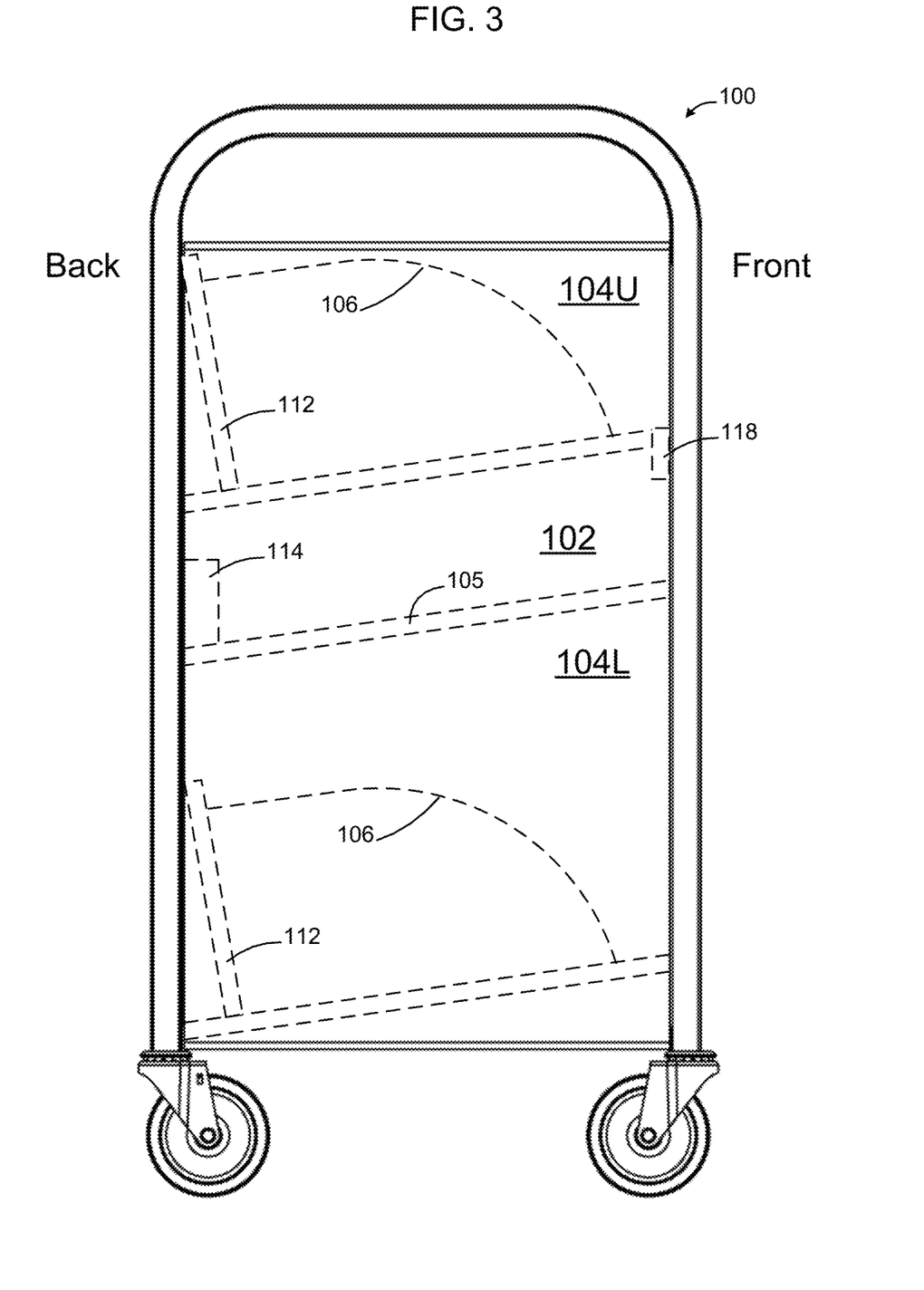
FIG. 3 is a left side view of the example open concept computer cart of FIG. 1, the right-side view being a mirror image thereof, according to some embodiments.

FIG. 3 is a side view of the example open concept computer cart 100 of FIG. 1. Although in some embodiments the side panels of the computer cart 100 are solid panels, in FIG. 3 the outline of the rearwardly inclined shelves 104U, 104L, the forward-facing brick storage area 102, and other aspects of the interior of the cart have been illustrated using dashed lines to help illustrate the internal configuration/layout of the shelves 104U, 104L, and brick storage area 102 within the open concept computer cart 100.

As shown in FIG. 3, in some embodiments the upper portable computer storage shelf 104U and the lower portable computer storage shelf 104L are both rearwardly inclined. As noted above, the term "rearwardly inclined" means that the shelf slopes downward as it traverses from the front of the cart (right-hand side in FIG. 3) to the back of the cart (left-hand side in FIG. 3). Optionally a short upwardly extending lip (not shown) may be formed along the front edge of each of the upper and lower computer storage shelves 104U, 104L. By causing the portable computer storage shelves to be rearwardly inclined, when a portable computer is placed on the shelf, gravity will help retain the portable computer within the storage bay, to help prevent the portable computers from falling out when the computer cart 100 is being moved, for example as the computer cart 100 is moved between classrooms.

One or more power outlet strips 114 are formed, in some embodiments, along a back wall of the forward-facing brick storage area 102. The power outlet strip 114 is visible, for example, in FIGS. 2 and 13-15. Although not shown in the figures, the computer cart 100 has a charging cord to connect the computer cart to mains power. In some embodiments, the power outlet strip 114 includes one outlet for each portable computer storage slot, and optionally one or more auxiliary outlets. Depending on the implementation, the power outlet strip 114 may be implemented using multiple charging zones (sets of computers) that are selectively turned on/off by a power regulator to regulate the total amount of power provided to the portable computers stored within the open concept charging computer cart. Regulating the total amount of power provided to the portable computers prevents the computer cart 100 from drawing more than approximately 15 Amps of current from mains power, which is often the maximum rated current for a standard wall outlet. An example method of distributing power between a plurality of charging zones is described in U.S. Pat. No. 8,870,195, entitled "Computer Cart", the content of which is hereby incorporated herein by reference.

In some embodiments, the power outlet strip 114 includes a number of National Electrical Manufacturers Association (NEMA) electrical outlets 116 to provide AC power to portable computers within the computer cart 100. In this implementation, as shown in FIG. 2, portable computer bricks include an AC cord that is plugged into the AC electrical outlets 116 of the power outlet strip 114.

The forward-facing brick storage area 102 provides a convenient storage area for the bricks within the computer cart 100. A charging tether 130 extends from each of the bricks toward the front of the cart, and each charging tether 130 is threaded into a wire retention cutout 120 of the wiring retention strip 118 (see FIGS. 7-11). In some embodiments, the wiring retention strip 118 is formed at the front of the forward-facing brick storage area 102 to make the connectors 132 on ends of the charging tethers 130 available at the front side of the computer cart 100 adjacent the storage shelves 104U, 104L. This enables the connectors 132 on the ends of the charging tethers 130 to be available to be connected to the portable computers on both shelves, when the portable computers are placed into the computer cart 100 for storage. Likewise, the charging tethers 130 may be disconnected from the portable computers and remain in the computer cart 100 when the portable computers are removed from the computer cart 100 for use.

Providing a wiring retention strip 118 at the front of the cart intermediate the upper and lower computer storage shelves 104U, 104L, enables tethers for portable computers on both shelves to be managed using a unitary structure. This is both cost effective, since a single component is able to be used to provide overall tether management for the entire cart, and reduces the weight of the cart. Further, from a user's perspective, having a unified wire management system that is close to the top of the cart and that is used for providing tether management for both shelves makes it easy for the user to be able to reach a tether when plugging or unplugging the tether from a selected portable computer, regardless of which shelf is being used to store the portable computer. Although some embodiments are shown in which the wiring retention strip 118 is provided on the underside of the upper computer storage shelf 104U, in some embodiments the wiring retention strip may be located in another location, such as on the upper edge of the shelf 105 forming the bottom of the forward-facing brick storage area.

Figure 2:
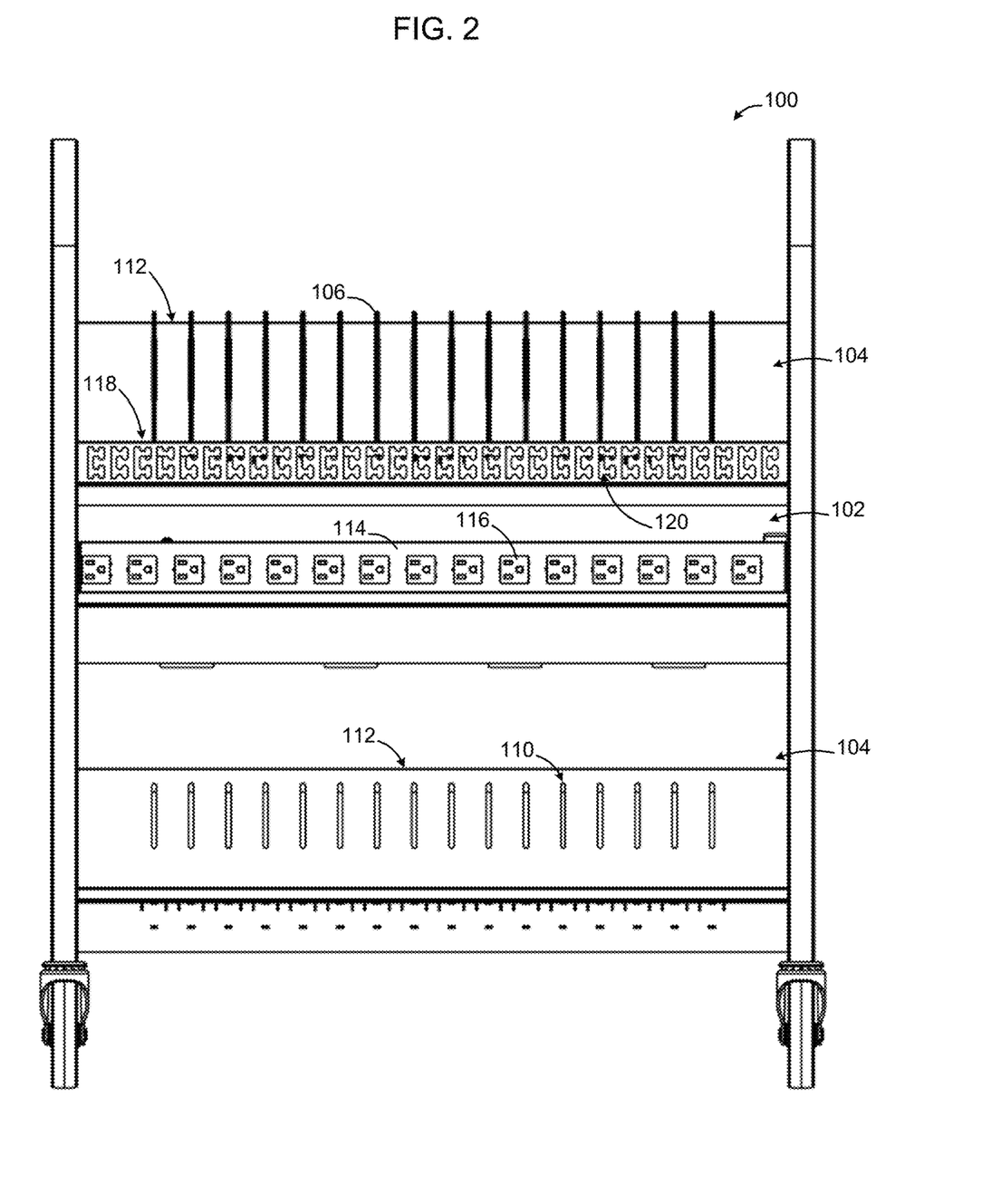
FIG. 2 is a front view of the example open concept computer cart of FIG. 1, according to some embodiments.
Figure 13:
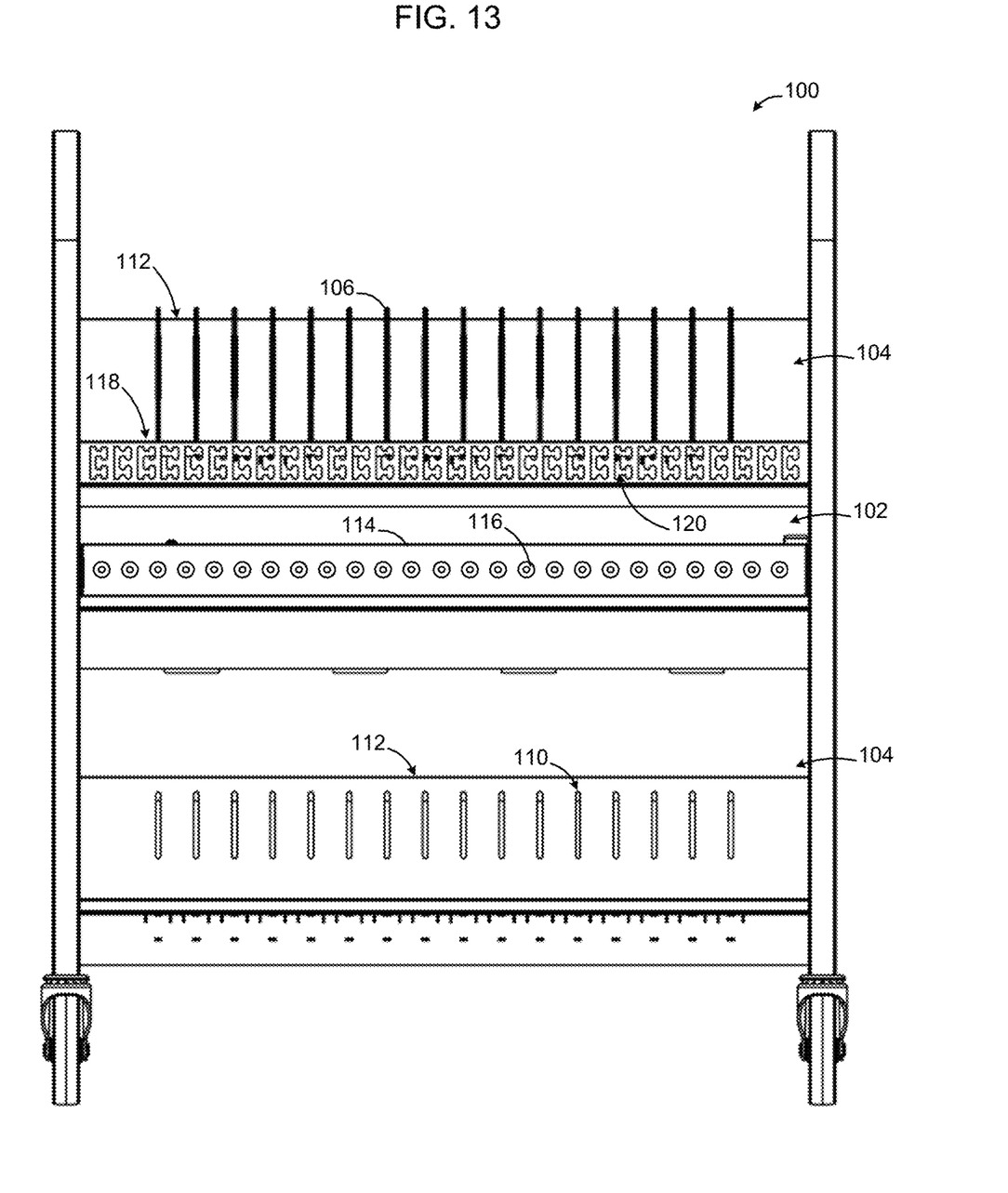
FIGS. 13-15 are front views of example open concept computer carts having different types of electrical connectors on the power outlet strip for connecting to tethers of portable computers, according to some embodiments.

Although an embodiment is shown in FIG. 2 in which the power outlet strip 114 includes a plurality of NEMA electrical outlets 116, in some embodiments other forms of electrical outlets are used. For example, in some implementations, the power outlet strip 114 is designed to provide DC power at a set of DC power outlets. In this implementation, rather than provide AC power which is converted individually using portable computer bricks, the power configuration unit directly supplies DC power to the set of DC power outlets. For example, the power outlet strip 114 may be configured to provide power to a set of portable computers by supplying DC power at between 19 and 24.5 V DC, or in an implementation, at approximately 20V DC and at a current level of up to approximately 8.5 A. Example DC power outlets may include cylindrical plugs such as barrel connectors or other types of DC connectors depending on the implementation. FIG. 13 shows an example charging cart in which the example DC power outlet has barrel connectors. The barrel connectors in FIG. 13 are not drawn to scale for ease of illustration. Charging tethers 130, in this implementation, are connected directly to the DC power outlets of the power outlet strip 114 to directly provide DC power to the set of portable or tablet computers stored in the computer cart 100 without requiring the bricks to be stored within the computer cart 100.

Figure 14:
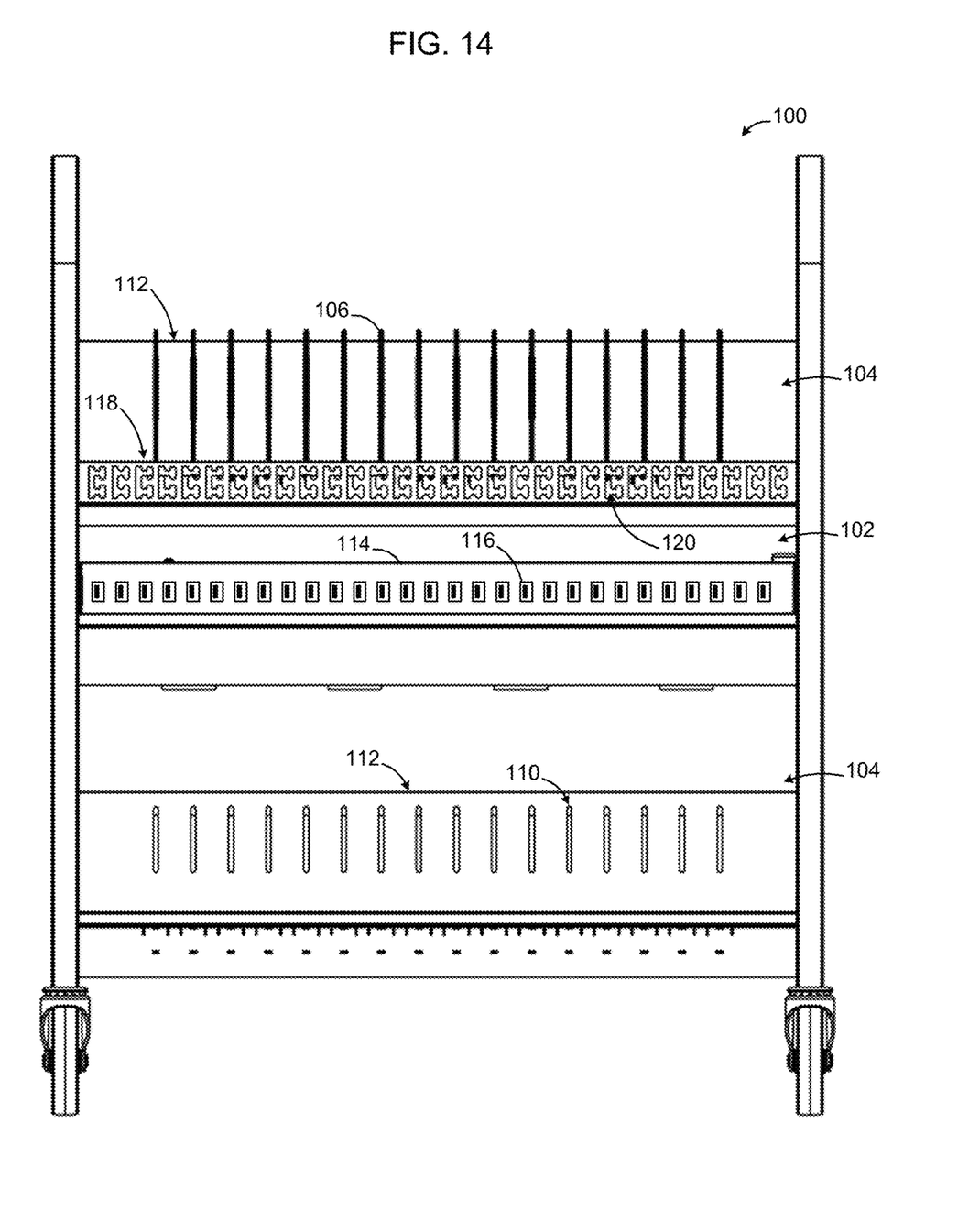
Figure 15:
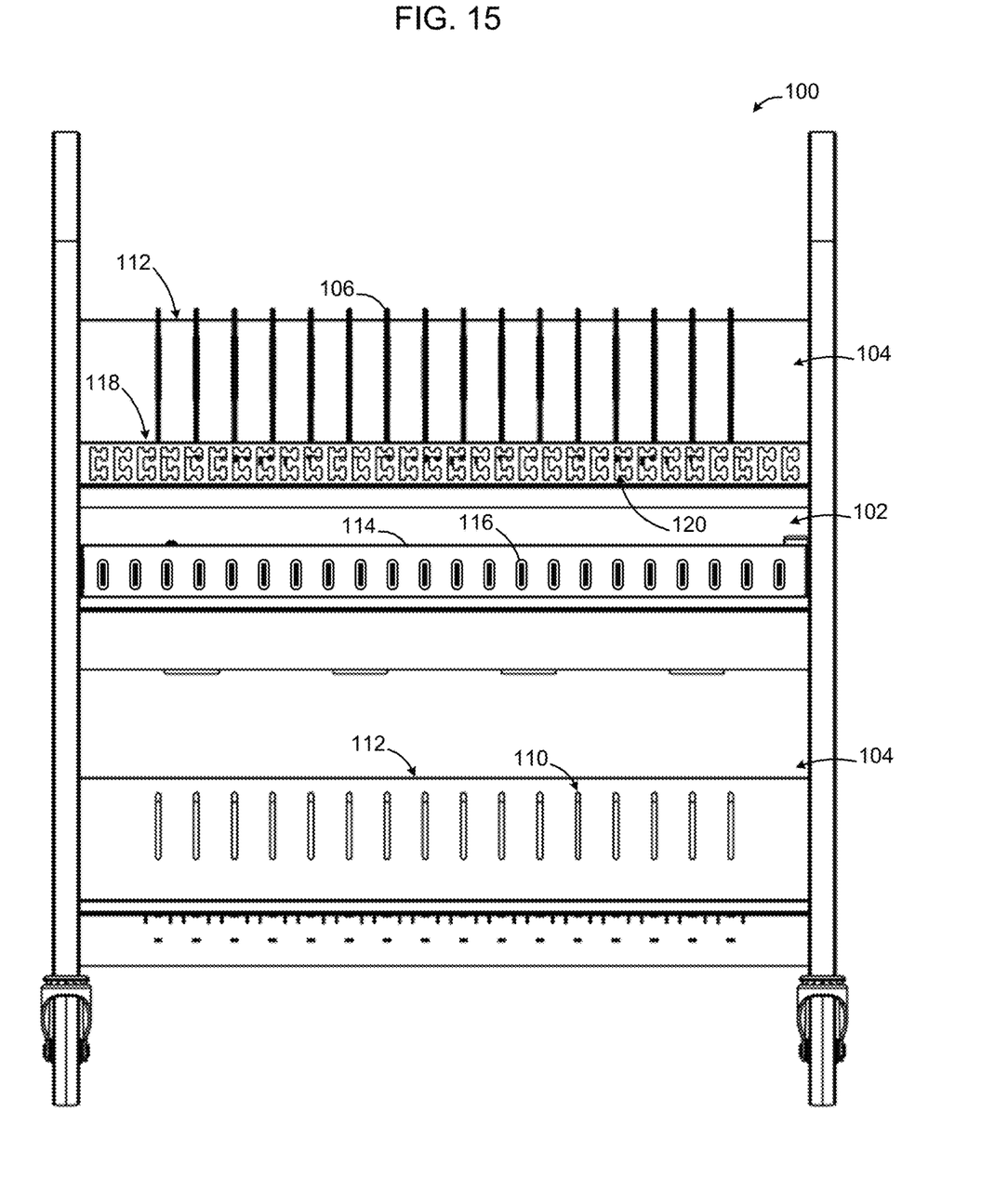

Many tablet and portable computers are designed to receive power at a voltage level specified in one of the Universal Serial Bus (USB) standards. Example USB standards specify might be 5V DC and up to 0.9 A, or 5V DC power at up to 2.4 A. USB 3 and subsequent versions of the USB protocol may specify other voltage/amperage charging profiles. According to some embodiments, the power outlet strip 114 is configured to include a set of USB ports designed to provide power at one of the voltages specified by one of the USB standards. In this implementation, the charging tethers 130 have USB connectors on one end to connect to the USB ports, and extend through the wiring retention strip 118 at the front of the forward-facing brick storage area. For example, FIG. 14 shows an example charging cart in which the example DC power outlet has USB-A type connectors, although the USB-A connectors are not drawn to scale for ease of illustration. Other types of USB connectors may be used as well, depending on the implementation. For example, FIG. 15 shows an example charging cart in which USB-C type connectors are provided on the power outlet strip. The USB-C connectors are not drawn to scale in FIG. 15 for ease of illustration.

As shown in FIGS. 1 and 2, a wiring retention strip 118 is provided on the front of the cart, for example along a top front surface of the forward-facing brick storage area. The wiring retention strip has wire retention cutouts 120 formed along its length. In some embodiments, the number of wire retention cutouts 120 correspond to the sum of the number of computer storage compartments defined by the dividers on the top and bottom computer storage shelves, or to correspond to the sum of the number of computer storage compartments provided by a set of baskets that are to be stored on the top and bottom computer storage shelves. In some embodiments, the number of wire retention cutouts 120 may exceed the number of computer storage compartments, for example in connection with a computer cart that may store different numbers of portable computers. For example, the cart may have slots arranged to enable dividers to be disposed on the upper and lower shelves in a variety of ways, such as to provide either 24 or 36 storage compartments, depending on the configuration. The wiring retention strip 118, however, may have 36 wire retention cutouts 120 regardless of the manner in which the rest of the cart is configured for deployment.

To wire the cart, a person reaches into the forward-facing brick storage area, plugs a connector into one of the outlets 116 of the power outlet strip 118 at the rear of the brick storage area 102, and then threads the charging tether 130 through a selected one of the wire retention cutouts 120. Since the charging tether 130 does not need to be fed from a rear-ward facing compartment of the computer cart to the front of the computer cart, and the entire wiring process can take place from the front of the cart, this significantly reduces the amount of time it takes to install bricks and charging tethers, or charging tethers without bricks, into the computer cart. Since the ends of the tethers are threaded into and retained by the wiring retention strip at a location toward the top of the front of the cart, the tethers are provided at a convenient height for connection to portable computers on both the upper and lower shelves 104U, 104L.

Figure 7:
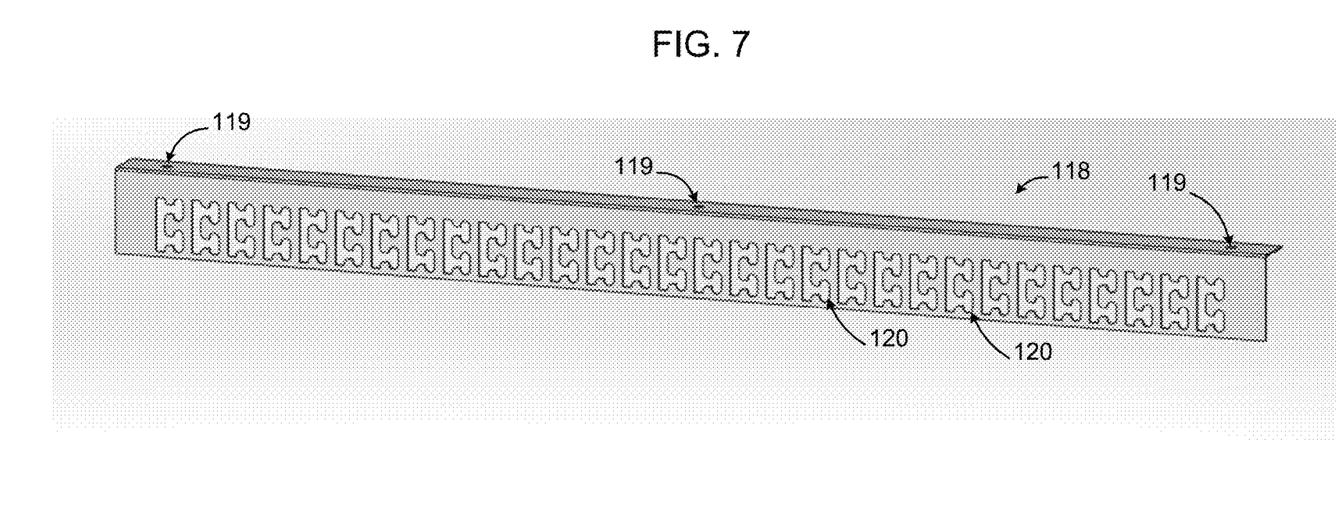
FIGS. 7-9 are front, perspective views of example wire retention strips for use on the example open concept computer cart of FIG. 1, according to some embodiments.
Figure 8:
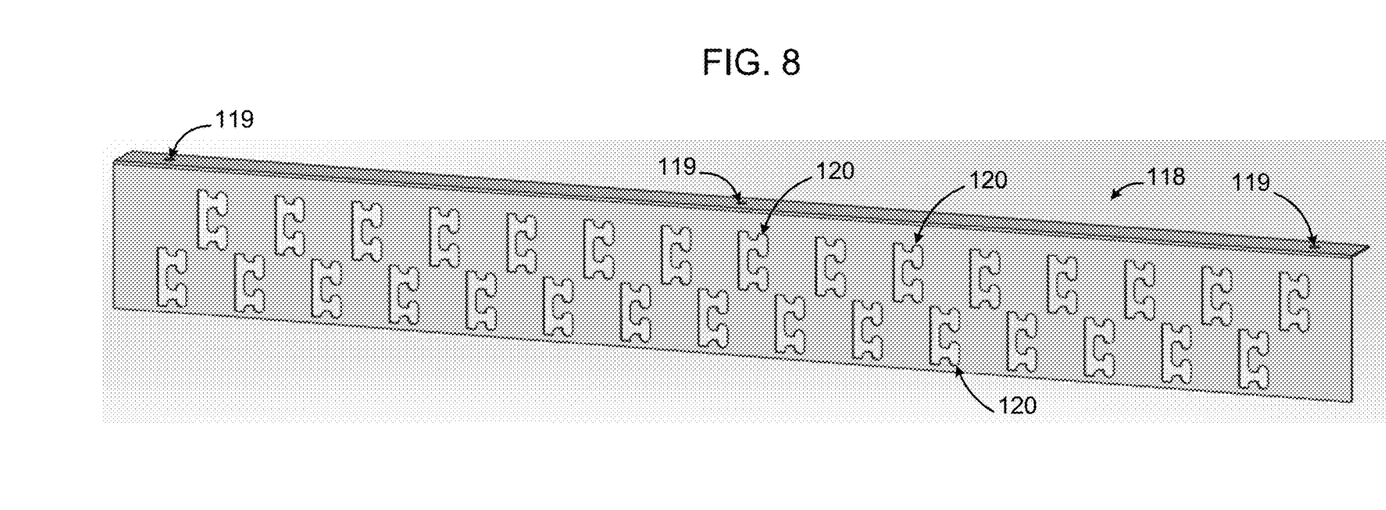
Figure 9:
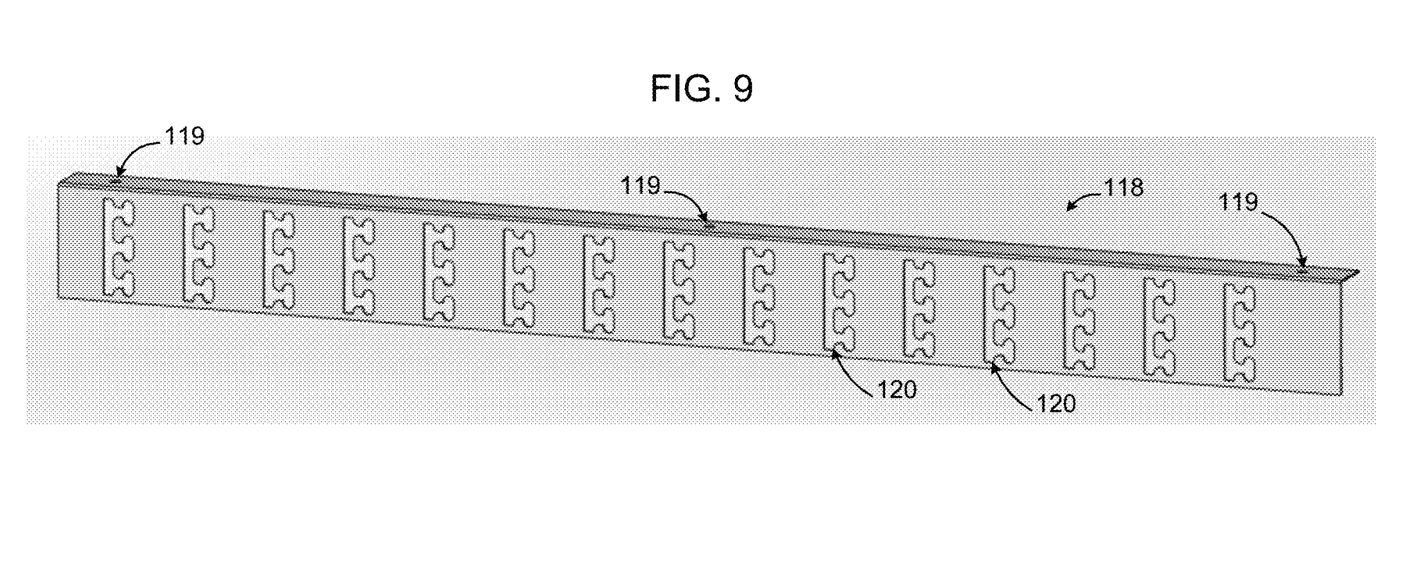

In some embodiments, as shown in greater detail in connection with FIGS. 7-9, the wire retention cutouts 120 are symmetrical in a vertical direction about a horizontal line, such that a charging tether can be threaded so that the connector 132 at the end of the tether 130 is either pointing up toward the upper shelf 104U or may be threaded so that the connector 132 is pointing down toward the lower shelf 104L. This helps direct the connectors 132 toward the correct shelf, for example in connection with embodiments where the different shelves correspond to different charging zones within the computer cart 100.

Figure 10:
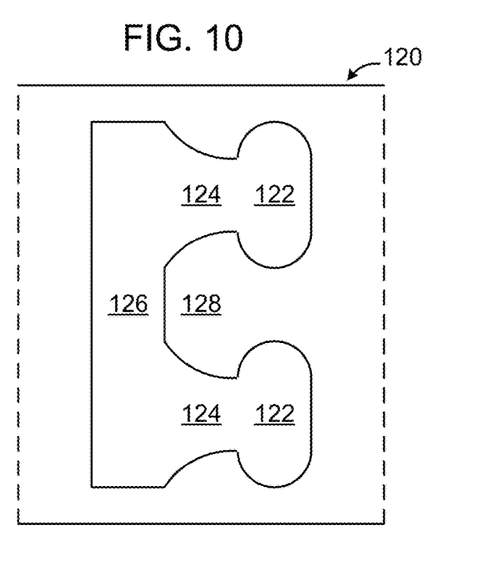
FIG. 10 is a close-up front view of a portion of the wire retention strip of FIG. 7 showing details of the wire retention cutouts, according to some embodiments. The same wire retention cutouts are also used in FIG. 8.
Figure 11:
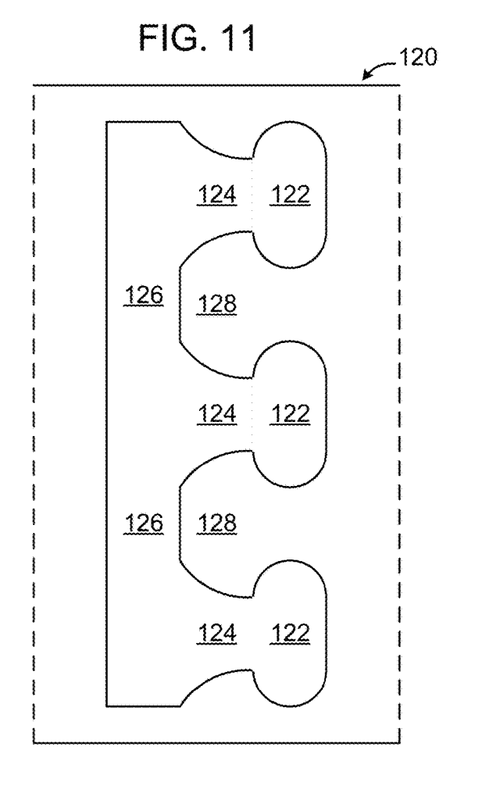
FIG. 11 is a close-up front view of a portion of the wire retention strip of FIG. 9 showing details of the wire retention cutouts, according to some embodiments.
Figure 12:
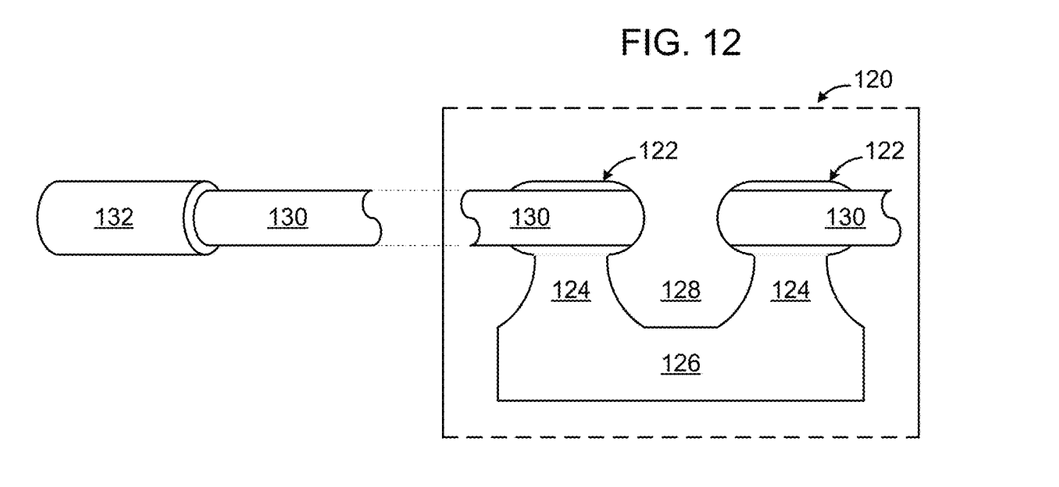
FIG. 12 is a close-up front view of an example wire retention cutout showing a charging tether threaded into the wire retention cutout, according to some embodiments.

FIGS. 7-9 show several example wiring retention strips 118, according to some embodiments. FIGS. 10-11 show example wire retention cutouts 120 in greater detail. FIG. 12 shows an example tether 130 threaded into an example wire retention cutout 120. The wiring retention strips 118 shown in FIGS. 7-9 each include sufficient wire retention cutouts 120 to retain charging tethers 130 for 30 portable computers. In FIGS. 7 and 8, thirty individual wire retention cutouts 120 are formed in the wiring retention strips 118. These wire retention cutouts are shown in greater detail in FIG. 10. In FIG. 9, fifteen double wire retention cutouts 120 are formed in the wiring retention strip 118. The double wire retention cutouts 120 are shown in greater detail in FIG. 11. If the computer cart 100 is designed to hold a different number of portable computers, the wiring retention strip 118 may have a corresponding different number of wire retention cutouts 120.

In some embodiments, the wiring retention strip 118 is a modular component that may be removed and replaced. For example, if the computer cart 100 is reconfigured to accommodate a different number of portable computers, the wiring retention strip 118 may be replaced with a different wiring retention strip 118 having a corresponding number of wire retention cutouts 120. Likewise, the particular wiring retention strip 118 may be selected based on the tethers to be used, so that the wire retention cutouts are appropriately sized based on the diameter of the charging tethers to ensure that the wire retention cutouts securely engage the charging tethers. In some embodiments, the wire retention strip is attached to the computer cart using bolts (not shown) that are inserted through apertures 119 that mate with corresponding apertures on the upper shelf 104U. In other embodiments the wire retention strip is attached to the computer cart permanently, such as by being welded to the upper computer storage shelf 104U or to the frame 101.

In some embodiments the wiring retention strip 118 is mounted on the computer cart in a fixed position. In other embodiments the wiring retention strip 118 is mounted on the computer cart on a pivot and is able to be rotated up into the forward-facing brick storage area, such that in a first pivoted position the wire retention strip 118 is disposed in a horizontal plane and folded up within the brick storage area, and in a second pivoted position the wire retention strip is disposed in a vertical plane (as shown) and faces outward toward the front of the cart.

FIG. 10 shows an example wire retention cutout in greater detail, which is configured to retain a single tether when the tether is threaded into the wire retention cutout. As shown in FIG. 10, in some embodiments the wire retention cutout has two oval-shaped openings 122 that are connected by channels 124 to a chase 126. The combination of the openings 122, channels 124, and chase 126, forms tongue 128. The tongue 128 is configured to enable a tether to be threaded into the wire retention cutout to be retained by the wire retention cutout. For example, to thread the tether onto the tongue 128, a bite (loop) of the tether is pushed through the chase 126 and then each side of the loop is moved through channels 124 to enter oval-shaped openings 122. When the tether is pulled taught to remove slack from the bite, the resilience of the tether and the edges of the oval-shaped openings 122 will prevent the tether from slipping back out through the channels 124 and chase 126, to thereby retain the threaded tether within the wire retention cutout.

In some embodiments, the openings, channels, and chase, are sized to be approximately the same width as a tether 130. For example, if the tether 130 is formed using a ¼ inch in diameter insulated wire, the openings, channels, and chase are similarly sized to be on the order of ¼ inch wide. Optionally, the channel 124 might be slightly narrower than ¼ inch wide. As anther example, if the tether 130 is formed using ⅛ inch diameter insulated wire, the openings, channels, and chase may similarly sized to be on the order of ⅛ inch wide. Thus, depending on the particular computer to be stored in the computer cart, and the dimensions of the tether associated with the portable computer, a wiring retention strip with appropriately sized wire retention cutouts may be selected and applied (bolted/welded) to the computer cart, to enable the tethers to be securely retained by the wiring retention strip.

FIG. 11 shows another example wire retention cutout in greater detail, which is configured to retain two tethers when the tethers are threaded into the wire retention cutout. In the embodiment shown in FIG. 11, the wire retention cutout has three oval-shaped openings 122 that are connected by channels 124 to chase 126. The combination of the openings 122, channels 124, and chase 126 forms two tongues 128, in FIG. 11. Each tongue 128 is configured to enable a tether to be threaded into the wire retention cutout to be retained by the wire retention cutout. Optionally, the central oval-shaped opening 122 may be slightly larger than the top and bottom oval-shaped openings 122, due to the fact that the central oval-shaped opening 122 will need to accommodate two tethers.

FIG. 12 is a close-up front view of an example wire retention cutout 120 showing a charging tether 130 threaded into the wire retention cutout 120, according to some embodiments. As shown in FIG. 12, in operation a bite of the tether 130 is pushed into chase 126, and the tether 130 is then slid around the tongue 128 until the tether 130 is disposed in openings 122. When the tether is pulled taught to remove slack from the bite, the resiliency of the tether 130 and the semi-circular edges of the top and bottom openings 122 serve to retain the tether 130 once inserted into the wire retention cutout 120. Since the process of inserting a bite of the tether into the wire retention cutout 120 is relatively quick and easy to implement, wiring the computer cart 100 is able to be implemented extremely quickly. In FIG. 11, a process similar to that of FIG. 12 is used to enable a first tether to be retained by the top tongue 128, and a second tether to be retained by the lower tongue 128. Thus, in FIG. 11, the wire retention cutout is used to retain two charging tethers.

A number of implementations have been described. Nevertheless, it will be understood that additional modifications may be made without departing from the scope of the inventive concepts described herein, and, accordingly, other implementations are within the scope of the following claims.

What is claimed is:

1. An open concept computer cart, comprising:
    a frame;
    a lower portable computer storage shelf supported by the frame, the lower portable computer storage shelf being rearwardly inclined within the computer cart when the frame of the computer cart is disposed on a horizontal surface;
    an upper portable computer storage shelf supported by the frame, the upper portable computer storage shelf being rearwardly inclined within the computer cart when the frame of the computer cart is disposed on a horizontal surface;
    a forward-facing brick storage area supported by the frame; and
    a wiring retention strip formed along a front surface of the computer cart.

2. The open concept computer cart of claim 1, wherein the forward-facing brick storage area is formed to be vertically intermediate the upper portable computer storage shelf and the lower portable computer storage shelf.

3. The open concept computer cart of claim 2, wherein the forward-facing brick storage area is defined by a bottom surface of the upper portable computer storage shelf and a bottom panel extending above the lower portable computer storage shelf.

4. The open concept computer cart of claim 1, wherein the open concept computer cart does not have a top surface, front doors, or rear panel/doors.

5. The open concept computer cart of claim 1, wherein the wiring retention strip is fixed to the cart.

6. The open concept computer cart of claim 1, wherein the wiring retention strip is pivotably disposed on the cart.

7. The open concept computer cart of claim 1, wherein the wiring retention strip has a plurality of wire retention cutouts formed therein.

8. The open concept computer cart of claim 7, wherein each wiring retention cutout has a chase, a first wire retention opening connected to the chase by a first channel, and a second wire retention opening connected to the chase by a second channel.

9. The open concept computer cart of claim 7, wherein the first and second wire retention openings are oval in shape.

10. The open concept computer cart of claim 7, wherein the chase, first and second wire retention openings, and first and second channels, are each approximately a width of a charging tether.

11. The open concept computer cart of claim 7, further comprising:
    a first plurality of dividers, secured within the lower portable computer storage shelf, to divide the lower portable computer storage shelf into a first plurality of computer storage areas; and
    a second plurality of dividers, secured within the upper portable computer storage shelf, to divide the upper portable computer storage shelf into a second plurality of computer storage areas; and
    wherein a number of the plurality of plurality of wire retention cutouts formed on the wiring retention strip is equal to or exceeds a sum of the first and second plurality of computer storage areas.

12. The open concept computer cart of claim 1, further comprising a power outlet strip formed along a rear of the brick storage area.

13. The open concept computer cart of claim 12, wherein the power outlet strip has a plurality of National Electrical Manufacturers Association (NEMA) Alternating Current (AC) electrical outlets.

14. The open concept computer cart of claim 12, wherein the power outlet strip has a plurality of barrel jack Direct Current (DC) electrical outlets.

15. The open concept computer cart of claim 12, wherein the power outlet strip has a plurality of Universal Serial Bus (USB) Direct Current (DC) electrical outlets.

\* \* \* \* \*